United States Patent [19]

Cook

[11] Patent Number: 4,890,897

[45] Date of Patent: Jan. 2, 1990

[54] SINGLE MODE CONNECTOR

[75] Inventor: John S. Cook, Rumson, N.J.

[73] Assignee: Minnesota Mining and Manufacturing Company (3M), Saint Paul, Minn.

[21] Appl. No.: 195,233

[22] Filed: May 18, 1988

[51] Int. Cl.[4] ............................ G02B 6/00; G02B 6/36
[52] U.S. Cl. .................................. 350/96.21; 350/96.20
[58] Field of Search ................. 350/96.20, 96.21, 96.22

[56] References Cited

U.S. PATENT DOCUMENTS

| 4,291,941 | 9/1981 | Melzer | 350/96.18 |
| 4,296,999 | 10/1981 | Mead | 350/96.18 X |
| 4,497,536 | 2/1985 | Payne et al. | 350/96.18 X |
| 4,639,076 | 1/1987 | Mikolaicyk et al. | 350/96.18 X |
| 4,714,317 | 12/1987 | Szentesi | 350/96.20 X |
| 4,737,006 | 4/1988 | Warbrick | 350/96.18 |

Primary Examiner—William L. Sikes
Assistant Examiner—Akm E. Ullah
Attorney, Agent, or Firm—Donald M. Sell; Walter N. Kirn; Stephen W. Buckingham

[57] ABSTRACT

A single mode optical fiber connector assembly for reducing the need for both positional and angular accuracy is provided. A housing and two single mode optical plugs each containing an optical fiber therein are provided. The housing, is adapted to receive a plug in each end of the housing and is dimensioned to automatically secure the plugs in both positional and angular alignment.

9 Claims, 1 Drawing Sheet

SINGLE MODE CONNECTOR

BACKGROUND OF THE INVENTION

This invention is directed to an optical fiber connector assembly and, in particular to a single mode optical fiber connector assembly.

Single mode optical fiber connectors are well known in the art. They generally include at least one conically or cylindrically shaped plug containing an optical fiber. A housing for receiving a plug having coaxial conically shaped recepticals or a cylindrical channel therein aligns the plug with either a second similar plug aligned within the housing or an optical fiber integrally contained within the housing. The fiber is contained within a channel in the plug and transmits light to the second optical fiber by direct end-to-end contact, or near contact, between the fiber ends.

These prior art devices are less than completely satisfactory. Because of the small size of optical fibers they suffer significant loss of light transmission in the presence of microscopic particulates that cling to the alignment housing or the plug. They also suffer from the inherent difficulty in aiming a small beam of light at a small optical fiber target. This results in the need for extreme positional accuracy between the two optical fibers to avoid such loss. Other prior art devices overcome this by using lenss in the plugs to produce wide beams of light. However, extreme angular alignment accuracy is then required due to the difficulty in focusing a wide light beam at a small fiber core. Accordingly, a single mode optical fiber connector that overcomes the shortcomings of the prior art devices described above is desired.

SUMMARY OF THE INVENTION

Generally speaking, in accordance with the instant invention, a single mode optical fiber connector assembly has a housing, a first single mode optical plug and a second single mode optical plug each containing an optical fiber therein. Each optical fiber is positioned within each plug extending short of the nose end of the plug so that it is not flush with the nose end. A lens, positioned within the nose of the plug transmits light received from the optical fiber beyond the nose of the plug in an expanded collimated beam. The housing includes a stiff sleeve having a biconical septum centered within the sleeve and is adapted to receive the first single mode optical plug and the second single mode optical plug therein. The housing is dimensioned so that when the nose of each plug is resting on the septum, the tail of each plug is secured by the sleeve, keeping the plugs in an angular alignment. A disconnectable clip secures each plug within the housing in facing relationship.

Accordingly, it is an object of the instant invention to provide an improved single mode optical fiber connector assembly.

Another object of the instant invention is to provide a single mode optical fiber connector assembly which balances the need for beam width with the need for angular accuracy.

Still a further object of the instant invention is to provide a single mode optical fiber connector assembly with near minimum sensitivity to the presence of dirt that can cause either positional or angular misalignment.

Yet another object of the instant invention is to provide a single mode optical fiber connector assembly less sensitive to careless handling.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 1:
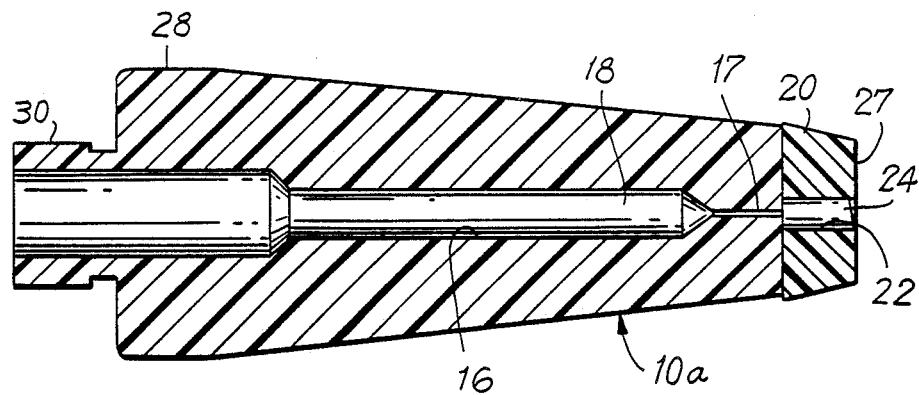
FIG. 1 is a cross-sectional view of a single mode optical plug constructed in accordance with the instant invention.
Figure 2:
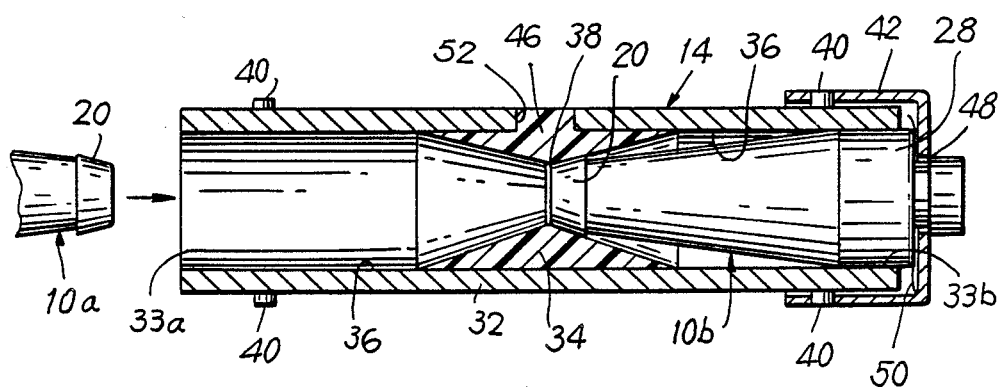
FIG. 2 is a sectional view of a single mode optical fiber connector assembly constructed in accordance with the instant invention.

Reference is made to FIGS. 1 and 2 wherein a single mode optical fiber connector assembly constructed in accordance with a preferred embodiment of the instant invention is depicted. The single mode optical fiber connector assembly includes a housing, generally indicated as 14, a first single mode optical fiber plug, generally indicated as 10a and a second single mode optical fiber plug generally indicated as 10b.

Plugs 10a and 10b are identical in construction and therefore in describing the construction of the single mode optical fiber plugs, reference need only be made to plug 10a. Plug 10a having a nose 20 and a tail 28 is conical in shape. Nose 20 is formed integrally with plug 10a and is also of a conical shape. Plug 10a is formed with a crimp 30 that allows securing of plug 10a at tail 28. A bored hole 16 extends coaxially through plug 10a and communicates with a fiber hole 17 contained within plug 10a. An optical fiber 18 extends through bore 16 and fiber hole 17. A bore 22 having a diameter equal to, or wider than fiber hole 17 communicates with fiber hole 17 and extends coaxially through nose 20 to a front surface 27. A lens 24 is contained within bore 22 and is optically coupled to optical fiber 18, transmitting light waves received from optical fiber 18 beyond surface 27 of plug 10a.

Lense 24 expands the beam in preparation for radiation from the end of plug 10a. If the beam is expanded to a range between 50 $\mu$m and 80 $\mu$m in diameter, the concern for cleanliness in terms of microscopic dust or film is greatly relieved, i.e. the need for the removal of microscopic particles decreases as does the need for positional accuracy. Therefore, lens 24 is sized to expand the beam to about 60 $\mu$m in diameter. The diameter of the beam of light is measured as the distance between the intensity inflection points across the beam.

Furthermore, the shorter the distance (length of a uniform index lens) over which the beam is expanded the less critical it becomes to have angular alignment. Lens 24 therefore, produces a modestly enlarged beam while keeping the focal length of the lens short.

To maintain angular control of plugs 10a, 10b each is inserted into the respective ends of housing 14. Housing 14 has a rigid hollow circular sleeve 32 having at each end respective openings 33a, 33b. A biconic septum 34 centered relative to sleeves 33a, 33b is provided within housing 14. Sleeve 32 has a length from each end 33a or 33b to septum 34 equal to the distance from nose 20 to tail 28 of either plug 10a or 10b. Therefore nose 20 of each plug 10a, 10b rests on an opposed side of septum 34 in facing relationship while tails 28 of each plug 10a, 10b come in contact with inner surface 36 of sleeve 32 retaining plug 10a, 10b within housing 14, thereby automatically maintaining angular alignment and positioning of plugs 10a, 10b with respect to each other. Noses 20 of plugs 10a, 10b do not come in contact with each other, thereby forming an air gap 38 between plugs 10a, 10b.

Bayonet pegs 40 extend from the outer surface of sleeve 32. A cap 42 having an opening 48 therethrough slides over bayonet pegs 40 and crimp 30, further securing plug 10a within sleeve 32. A spring 50 positioned about crimp 30 biases cap 42 away from housing 14 to provide a locking fit between cap 42 and pegs 40. A fiber optical cable (not shown) passes through opening 48. Similarly, an additional cap 42 would be placed over bayonet pegs 40 located at the opposite end of sleeve 32 in order to secure plug 10b within sleeve 32.

In an exemplary embodiment, sleeve 32 is made of steel and has at least one opening 44 in its side to allow injection molding of septum 34 from a rigid plastic. A rib 46, being excess material from the injection molding process, remains within an opening 52 and acts to anchor septum 34 within circular sleeve 32. Plug 10a may be constructed of any rigid material which will retain the optical fiber and lens in place within the plug over time. Sleeve 32 is 5.0 cm long and has a diameter dimensioned so that it may contain septum 34 which defines an opening 35 having a diameter of between 0.50 cm and 0.76 cm. The angle of the cone formed by septum 34 is 30°.

As noted above, in an exemplary embodiment, the desired width of the light beam is 60 μm. It is noted that either a simple optical lens with its axis coincident with the spreading beam of light or a graded index lens may be used. However, in the preferred embodiment a simple optical lens is used. To provide the appropriate beam width, the focal length of lens 24 is about 1.0 mm. In the preferred embodiment, the maximum allowable amount by which the beam focus may miss its target is 0.5 μm. It is noted that each of the dimensions detailed above, including the lens, are provided by way of example.

Plug 10a, is placed within housing 14 with nose 20 resting on septum 34, tail 28 being anchored by inner surface 36 and is clamped into place by cap 42 about crimp 30. Similarly, plug 10b is placed within sleeve 32 with nose 20 resting against septum 34 and tail 28 being anchored by inner surface 36 and cap 42. Plugs 10a and 10b are now in facing relationship and optically coupled. When plugs 10a and 10b are arranged in accordance with the invention the beams of light passing between the optical fibers in hole 17 in plugs 10a and 10b are automatically aligned.

Accordingly, by providing a plug containing a lens of short focal-length producing a modestly wider beam, it is possible to produce a single mode optical fiber connector assembly which does not require a great degree of accuracy in positional alignment. By providing a well centered septum within a rigid column which receives the plugs and a cap for securing the plugs within the column, the alignment accuracy of the plugs with respect to each other is automatically secured. Accordingly, a connector assembly is provided which reduces the problems of careless handling.

It will thus be seen that the objects set forth above, among those made apparent from the preceeding description, are efficiently attained and, since certain changes may be made in the above constructions without departing from the spirit and scope of the invention, it is intended that all matter contained in the above description are shown in the accompanying drawings and shall be interpreted as illustrative and not in a limiting sense. For example, modest beam expansion is also advantageous for certain multimode optical fiber connectors.

It is understood that the following claims are intended to cover all the generic and specific features of the invention herein described and all statements of the scope of the invention which, as a matter of language, might be said to fall therebetween.

What is claimed is:

1. A single mode optical fiber connector assembly comprising:
   a first single mode optical plug containing an optical fiber therein;
   a second single mode optical plug containing an optical fiber therein;
   positioning means for optically coupling said first single mode optical plug and said second single mode optical plug and automatically securing each of said optical plugs in angular alignment with each other, said positioning means including a housing having a first end and second end, a respective single mode optical plug being received in a respective end, a septum integrally formed within said single mode optical plug being conical in shape to rest within said septum and an inner surface of said housing coming in contact with a tail end of each of said first and second single mode optical plugs thereby automatically angularly aligning each of said single mode optical plugs with the other.

2. The optical fiber connector assembly of claim 1, further comprising, beam widening means contained within each of said first and second plugs for increasing the width of a beam of light as it exits from each of said plugs.

3. The single mode optical fiber connector assembly of claim 2, wherein said beam widening means comprises a nose integrally formed on each of said first and said second single mode optical plugs, a lens contained within each nose, said lens having one end in contact with said optical fiber and said lens being coaxial with said optical fiber.

4. The single mode optical fiber connector assembly of claim 1, further comprising disconnectable holding means for securing the said first single mode optical plug and said second single mode optical plug within said positioning means.

5. The single mode optical fiber connector assembly of claim 1, further comprising disconnectable holding means for securing the said first single mode optical plug and said second single mode optical plug within said positioning means.

6. The single mode optical fiber connector assembly of claim 5, wherein the disconnectable holding means comprises a plurality of bayonet pegs integrally formed on the other surface of said housing approximate each of said ends, a cap being selectively mounted on said bayonet pegs and covering each opening of said housing, thereby securing each of said first and second plugs therein.

7. The single mode optical fiber connector assembly of claim 3, wherein the lens is a graded index lens.

8. The single mode optical connector of claim 1, wherein said housing is made of steel.

9. The single mode optical connector of claim 3, wherein said lens is positioned at an angle relative to said optical fiber.

* * * * *